(12) United States Patent
Lathrop

(10) Patent No.: US 10,197,368 B2
(45) Date of Patent: *Feb. 5, 2019

(54) AUXILIARY CUTTING IMPLEMENT FOR ARROW

(71) Applicant: David Lathrop, Victor, NY (US)

(72) Inventor: David Lathrop, Victor, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/715,766

(22) Filed: Sep. 26, 2017

(65) Prior Publication Data

US 2018/0100726 A1   Apr. 12, 2018

Related U.S. Application Data

(63) Continuation-in-part of application No. 15/288,514, filed on Oct. 7, 2016, now Pat. No. 9,772,170.

(51) Int. Cl.
| | | |
|---|---|---|
| *F42B 6/08* | (2006.01) | |
| *F42B 12/34* | (2006.01) | |
| *F16F 1/02* | (2006.01) | |
| *F42B 6/04* | (2006.01) | |

(52) U.S. Cl.
CPC .............. *F42B 12/34* (2013.01); *F16F 1/025* (2013.01); *F42B 6/08* (2013.01); *F42B 6/04* (2013.01)

(58) Field of Classification Search
CPC ........................................................ F42B 6/08
USPC ........................................ 473/578, 582, 583
See application file for complete search history.

(56) References Cited

U.S. PATENT DOCUMENTS

| | | | | |
|---|---|---|---|---|
| 3,084,939 | A * | 4/1963 | Zwickey ................. | F42B 6/08 267/155 |
| 4,166,619 | A | 9/1979 | Bergmann et al. | |
| 4,254,958 | A * | 3/1981 | Bateman, III ........... | F42B 6/08 473/583 |
| 4,268,038 | A * | 5/1981 | Wierenga .............. | F42B 12/362 30/352 |
| 4,380,340 | A * | 4/1983 | Simo ........................ | F42B 6/04 473/577 |
| 5,022,658 | A * | 6/1991 | Burkhart ................. | F42B 6/04 473/578 |
| 5,143,380 | A * | 9/1992 | Maleski .................. | F42B 6/08 473/584 |
| 6,319,161 | B1 * | 11/2001 | Martinez ................ | F42B 6/08 473/583 |
| 7,226,375 | B1 | 6/2007 | Sanford | |
| 7,311,622 | B1 * | 12/2007 | Futtere .................... | F42B 6/08 473/583 |
| 7,374,505 | B2 * | 5/2008 | Polando .................. | F42B 6/08 473/584 |
| 7,905,802 | B2 | 3/2011 | Erhard | |
| 8,663,041 | B1 * | 3/2014 | Gryspeerd ............... | F42B 6/08 473/582 |

(Continued)

*Primary Examiner* — Alexander Niconovich
(74) *Attorney, Agent, or Firm* — Woods Oviatt Gilman LLP; Katherine H. McGuire, Esq.

(57) ABSTRACT

An auxiliary cutting implement for attachment between a broadhead and arrow shaft includes preferably two or more coils each having two cutting edges formed along their opposite elongated side edges. As the coils pass through the animal they unroll and slice through animal flesh in all directions. The coils are biased toward their rolled position which increases the multi-directional movement of the coil and cutting edges through the animal resulting in a large cutting area and fast kill as compared to the broadhead alone.

6 Claims, 6 Drawing Sheets

(56) References Cited

U.S. PATENT DOCUMENTS

| | | | |
|---|---|---|---|
| 8,668,606 B1* | 3/2014 | Gryspeerd | F42B 6/08 473/582 |
| 9,417,040 B2* | 8/2016 | Redavid, III | F42B 6/08 |
| 2004/0074483 A1* | 4/2004 | Kuhn | F42B 6/08 124/1 |

* cited by examiner

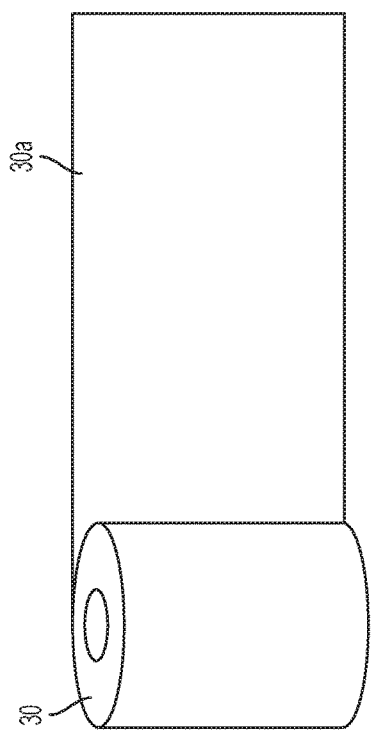
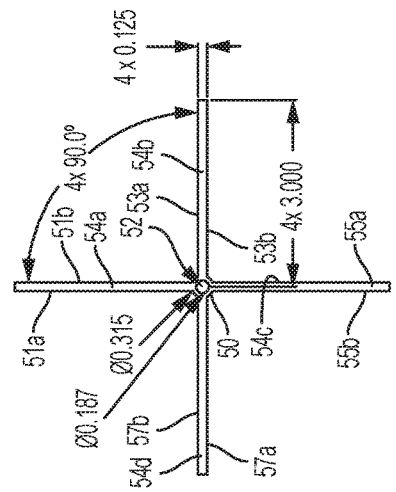
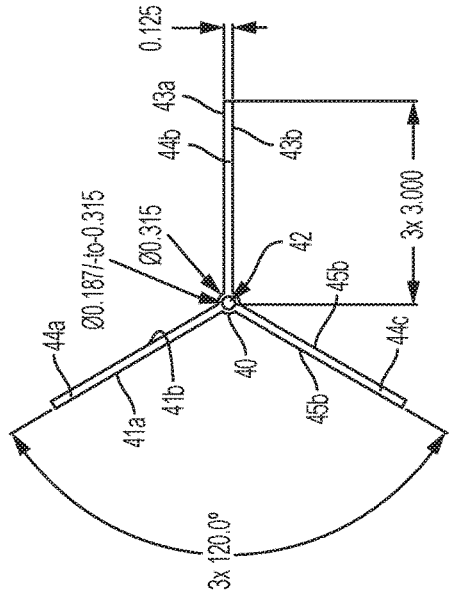

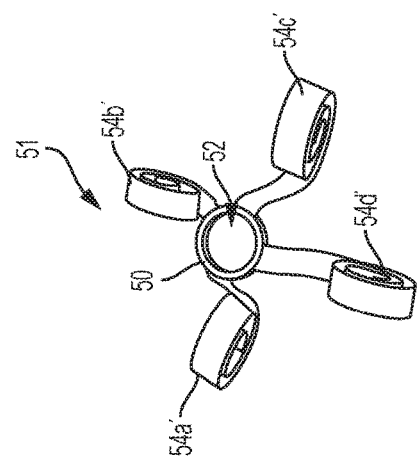
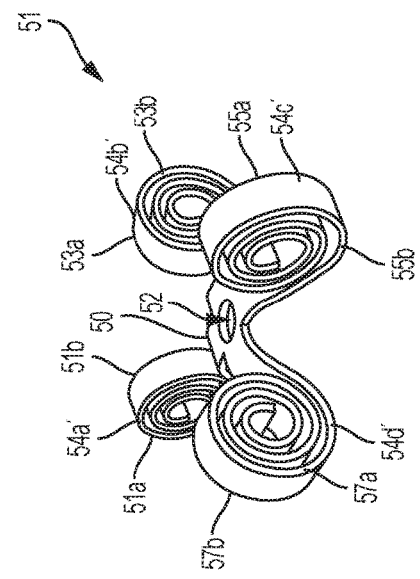
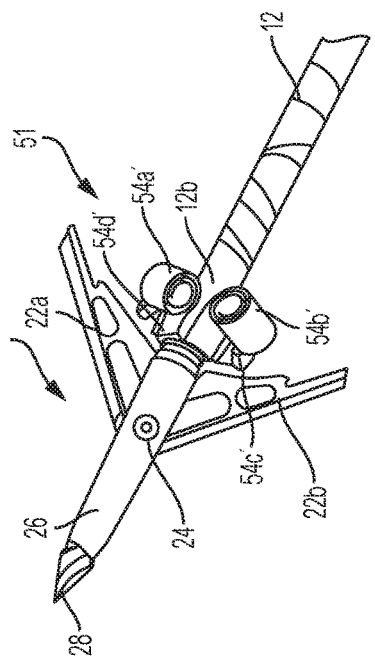
FIG. 10
FIG. 9
FIG. 11

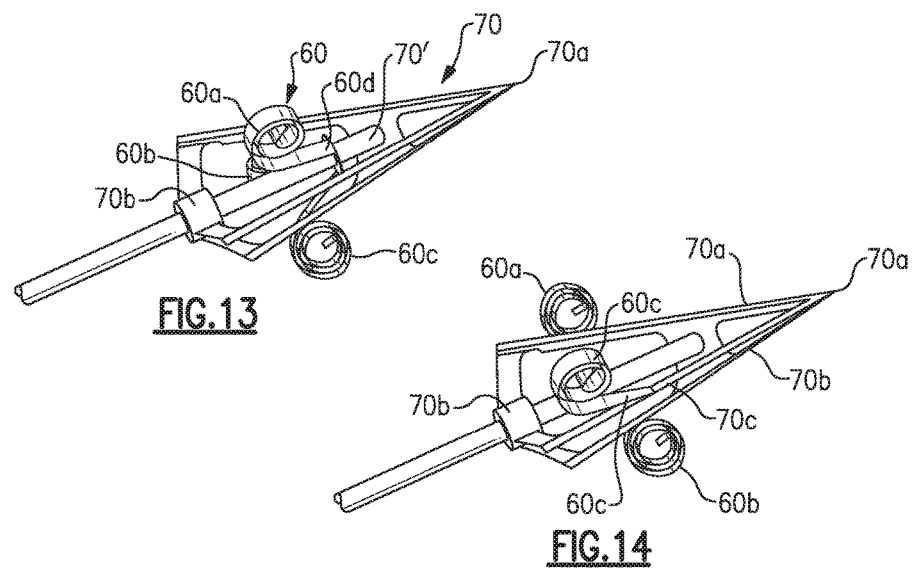
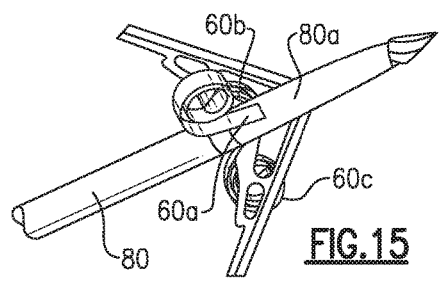
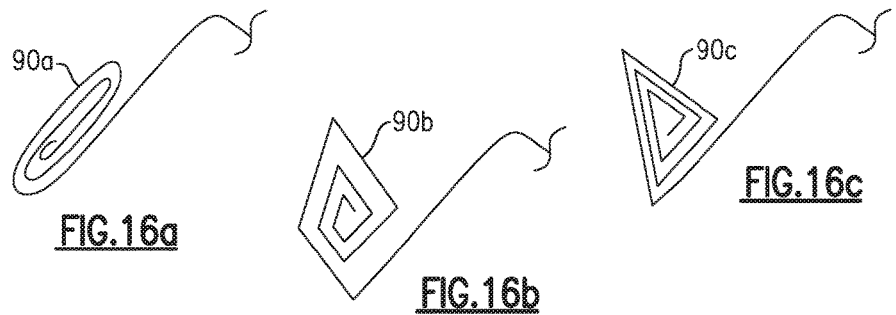

AUXILIARY CUTTING IMPLEMENT FOR ARROW

BACKGROUND OF THE INVENTION

The present invention relates to arrows having a detachable arrowhead, and more particularly relates to an auxiliary cutting implement configured to attach between the arrow shaft and arrowhead.

Bow hunting utilizes an arrow fired at an animal target with the arrow having a pointed arrowhead to penetrate and kill the animal. Modern day arrowheads include the so-called "broadhead" having either fixed or movable blades with usually 2 to 4 single edge blades arranged in a radially spaced pattern about the broadhead center shaft. The purpose of the blades is to increase the cutting area as the arrowhead penetrates and moves through the animal leading to a hopefully fast kill. The cutting area may be considered in terms of cutting diameter and a common broadhead provides a cutting diameter of about 2 inches or less.

Broadheads include a threaded shaft opposite the tip allowing the hunter to removably thread the broadhead to a threaded opening formed in the end of the arrow shaft opposite the cocked end. There is a large variety of broadheads on the market today with prices ranging anywhere from about $10 to about $50 or more. Some of the mechanical (movable blade) broadheads allow replacement of the blades as necessary. The replacement blades may cost anywhere from a few dollars to about $10 or more.

In all broadhead designs, a primary concern is aerodynamics—how it travels in flight in terms of speed and flight path. Since the broadhead blades extend radially of the arrow shaft, the blades necessarily introduce a deviation from the aerodynamics of an arrow without radially extending blades. The broadheads must therefore be designed with aerodynamic effect in mind; however, the design which might be best aerodynamically may not necessarily be the best design in terms of cutting paths and diameters, and vice versa. Designers of broadheads must therefore always be weighing their blade designs against the two, often conflicting parameters of aerodynamic effect and cutting pattern.

While present day broadheads are widely popular with bow hunters, the broadheads and replacement blades are expensive and are becoming maxed out in their cutting size due to the aerodynamic concerns which discourage designers from pursuing broadhead designs with any significant increase in presently offered cutting sizes.

SUMMARY OF THE INVENTION

The present invention addresses the above needs by providing an auxiliary cutting implement which is not part of the broadhead but rather is an attachment which is mounted between the arrow shaft and detachable broadhead.

In an embodiment, the present invention provides an auxiliary cutting implement having at least one, but preferably two or more cutting coils radially extending from a center fitting having a hole wherethrough the threaded end of a broadhead may pass. The threaded end of the broadhead is then threaded into the threaded hole formed in the end of the arrow shaft in the usual manner thereby securing the auxiliary cutting implement therebetween.

The auxiliary cutting implement may be formed as a unitary part where the center fitting and coils are cut or otherwise formed as a single part. The auxiliary cutting implement may be made from sheet metal such as stainless steel or carbon steel having a thickness providing flexibility and spring memory into the coils cut therefrom. In one embodiment, the auxiliary cutting implement is cut from the metal stock with a central fitting in the shape of a washer with two or more elongated strips which are spaced about and extend radially outward of the central fitting. The strips are each formed in an elongated, generally rectangular shape having first and second opposite elongated side edges. These side edges form the cutting edges and there are thus two cutting edges per strip/coil. This contrasts with a broadhead which provides only a single cutting edge per blade.

The strips are then bent downwardly at the point where they extend from the central fitting and are formed into coils. When mounted between an arrow and broadhead as described above, the arrow is fired with the coils imparting no adverse effects on the arrow aerodynamics.

Once the broadhead penetrates the animal, the coils, which trail behind the broadhead blades, unroll as they encounter the force imparted by skin, flesh and organs. As the coils first strike the animal, they utilize substantially all the potential energy within the arrow at the time of impact. The level of potential energy produced at the time of arrow release is in proportion to the power of the bow. This potential energy is discharged in part by the aerodynamic drag and in part by the coils in the form of cutting and tearing. Without the coils, much of the potential energy is wasted as the arrow without coils passes through the animal and then continues to travel for a long distance. While the arrow used with coils still passes through the animal, it only then travels a few more feet as the potential energy is used up faster due to the coil action.

The cutting edges formed on either edge of the coil strips slices through the animal. Since the coils have shape memory they are biased toward the coil position such that they transition from the initial coil position toward a fully unrolled position and bias back toward the coil position. As the coil transitions in this manner as it travels through the animal, the cutting edges of the coils slice through the flesh in all directions producing a cutting area which is significantly greater than that produced by the broadhead blades themselves. Such a large cutting area with no adverse aerodynamic effect has never before been realized and the present invention thus provides a significant advance in the art.

DESCRIPTION OF THE DRAWING FIGURES

The above-mentioned and other features and advantages of this invention, and the manner of attaining them, will become apparent and be better understood by reference to the following description of the invention in conjunction with the accompanying drawing, wherein:

FIG. 3 is a perspective view of a roll of sheet metal from which the auxiliary cutting implements may be made;

FIG. 4 is a plan view of a three coil embodiment prior to formation of the strips into coils;

FIG. 5 is a plan view of a four coil embodiment prior to formation of the strips into coils;

FIG. 9 is a perspective view of an embodiment of a four coil auxiliary cutting implement;

FIG. 10 is a perspective view of another embodiment of a four coil auxiliary cutting implement;

FIG. 11 is a fragmented, perspective view of another embodiment of a four coil auxiliary cutting implement mounted to an arrow and prior to firing the arrow;

FIG. 13 is a perspective, fragmentary view of an alternate embodiment of the invention showing a coil mounted on the arrow shaft in a location between the broadhead tip and base;

FIG. 14 is a perspective, fragmentary view of a further embodiment of the invention showing a coil integrally formed with the broadhead blades;

FIG. 15 is a perspective, fragmentary view of still a further embodiment of the invention showing a coil integrally attached to the arrow shaft; and FIGS. 16a-16c are simplified, fragmentary, side views of three alternative coil profiles, respectively.

DETAILED DESCRIPTION OF PREFERRED EMBODIMENTS

Figure 1:
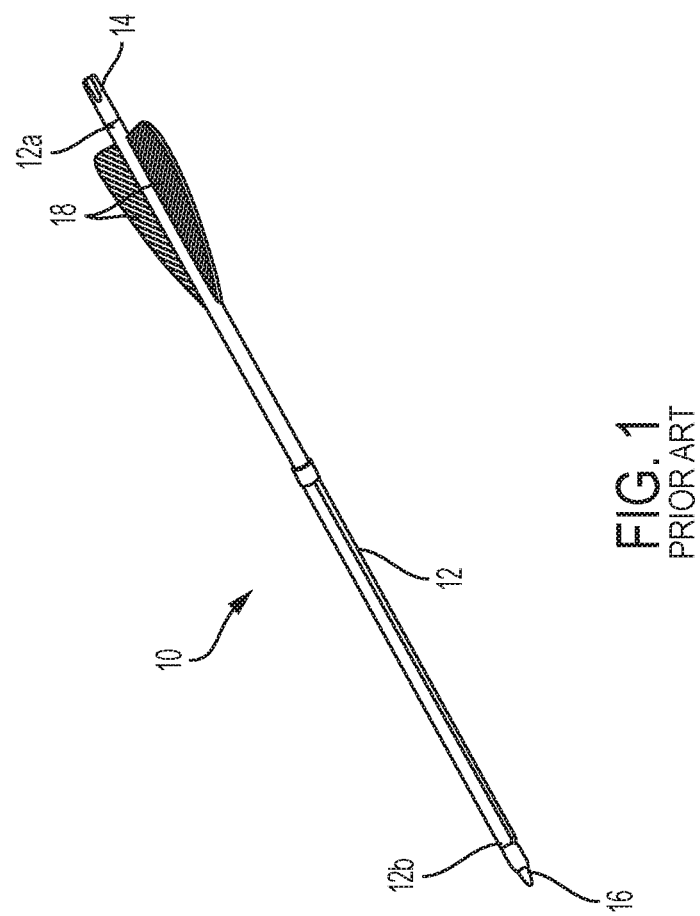
FIG. 1 is a perspective view of a prior art arrow.

Referring now to the drawing figures, there is seen in FIG. 1 a common prior art arrow 10 including an arrow shaft 12 having first and second ends 12a and 12b with an arrow nock 14 attached to first end 12a and an arrowhead in the form of a target point 16 attached to second end 12b. Fletchings 18 located adjacent nock 14 provide the aerodynamics allowing for a substantially straight flight path upon firing the arrow 10 from a bow (not shown). Arrows may have permanently mounted arrowheads or removable arrowheads which allow the archer to interchange arrowheads upon the arrow shaft as desired.

Figure 2:
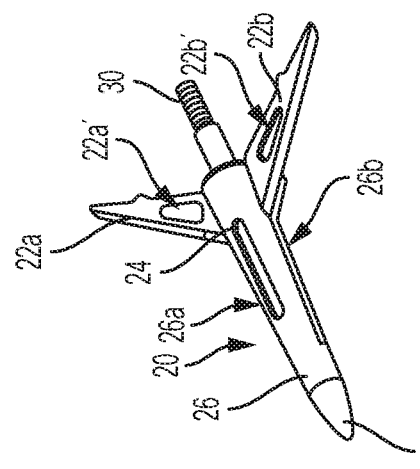
FIG. 2 is a perspective view of a prior art broadhead.

FIG. 2 illustrates a typical broadhead type of arrowhead that is popular with hunters. The broadhead 20 shown in FIG. 2 is referred to as a mechanical broadhead in that the blades 22a, 22b thereof are movable from a closed position (not shown) to the open position shown. Blades 22a, 22b include respective elongated slots 22a', 22b' which are mounted on a common pin 24 allowing the blades to slide on the stationary pin and come to rest within respective longitudinal grooves 26a and 26b formed in the broadhead main body 26. The distal end of broadhead 20 includes a pointed tip 28 while the proximal end includes a threaded shank 30 allowing broadhead 20 to be removably mounted to the end of an arrow opposite the nock end. For example, in the arrow 10 of FIG. 1, the plain target point 16 may be removed from shaft 12 and replaced with broadhead 20 by threading threaded shank 30 into a threaded hole (not shown) provided at end 12b. The threaded hole may be formed directly into the shaft or it may be provided as a separate insert as is known to those familiar with archery and particularly bow hunting.

As explained in the Summary of the Invention, designers of broadheads attempt to maximize the cutting capability of the broadhead blades without negatively impacting aerodynamic performance which has necessarily imposed limitations on the cutting area present day broadheads can provide. The present invention obviates these design limitations by providing an auxiliary cutting implement which is not part of the broadhead but rather is an attachment which is mounted between the arrow shaft and a detachable broadhead of any desired design (e.g., fixed blade, mechanical blade, double blade, triple blade, etc.).

Referring to FIGS. 3-5, FIG. 3 shows an example of a roll of sheet metal 30 from which the invention may be formed (e.g., by cutting or stamping). The type of material chosen may vary as desired but it preferably a metal that will have a spring bias (shape memory) upon bending prior to reaching the fatigue point of the metal. In an embodiment, the material may be full hard stainless steel shim stock in a sheet thickness of about 0.007 to about 0.010 inches.

A three coil auxiliary cutting implement 41 may be cut from an unrolled segment 30a of material in the form seen in FIG. 4 which includes a central annular fitting 40 having a center hole 42 and three elongated, generally rectangular strips 44a, 44b and 44c extending radially therefrom in a substantially equally spaced manner thereabout.

A four coil auxiliary cutting implement 51 may be cut from an unrolled segment 30a of material in the form seen in FIG. 5 which includes a central annular fitting 50 having a center hole 52 and four elongated, generally rectangular strips 54a, 54b, 54c and 54d extending radially from central fitting 50 in a substantially equally spaced manner thereabout.

A three coil cutting implement is preferred for use with a three blade broadhead whereas a four coil cutting implement is preferred for use with a two blade broadhead. As such, the coils may be positioned in a location which aligns with the spaces between the blades to create symmetry which aids in aerodynamically balancing the arrow (see FIG. 11 where two coils 54a' and 54b' are located in between blades 22a and 22b while the other two coils are located on the opposite side and again in between blades 22a and 22b). While a maximum of six coils is preferred, it is possible to further increase the number of coils beyond six if desired.

It may thus be realized that the auxiliary cutting implement may be formed as a unitary part where the central fitting and elongated strips are cut or otherwise formed into a single piece of material. Each elongated strip 54a, 54b, 54c and 54d includes respective first and second opposite elongated side edges 51a,51b, 53a,53b, 55a,55b and 57a,57b. These side edges may form cutting edges and there thus may be two cutting edges per strip/coil. This contrasts with a broadhead which provides only a single cutting edge per blade. The side cutting edges may be formed in any desired blade cutting edge and point style such as straight, serrated and tanto, for example. The side cutting edges may be formed at the initial cutting of material segment 30a or may be performed in a subsequent operation.

Figure 6:
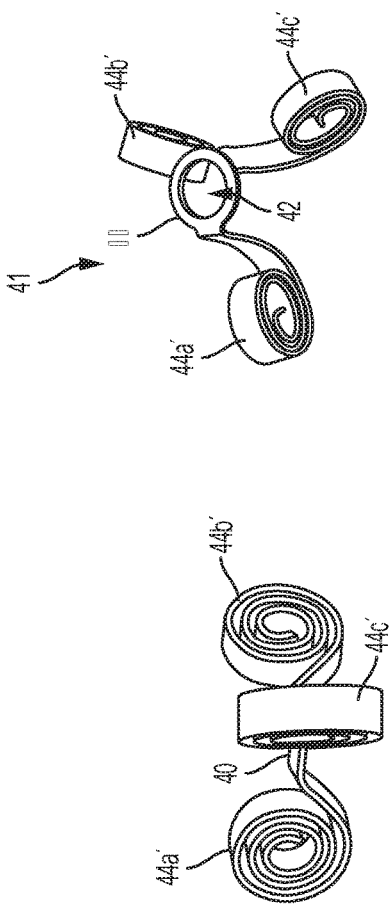
FIG. 6 is a perspective view of an embodiment of a three coil auxiliary cutting implement.
Figure 7:
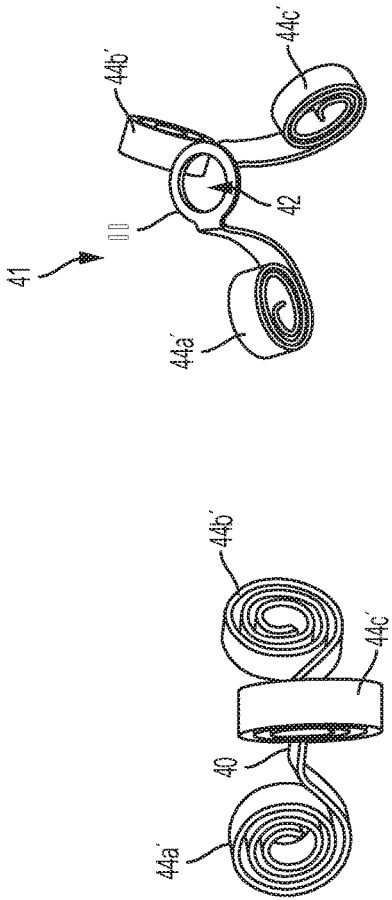
FIG. 7 is a perspective view of another embodiment of a three coil auxiliary cutting implement.
Figure 8:
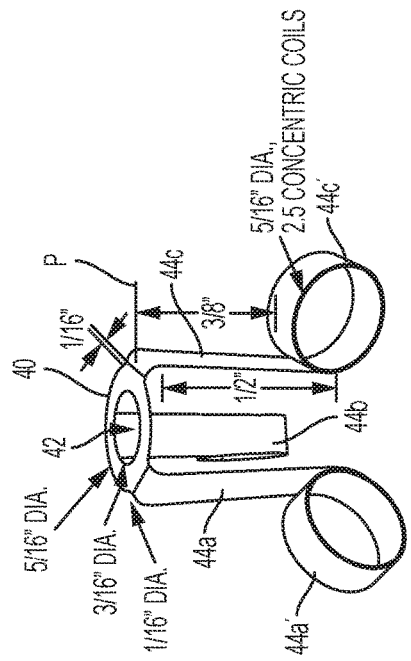
FIG. 8 is a perspective view of a mechanical drawing of another embodiment of a three coil auxiliary cutting implement.

The strips are then preferably bent away from the plane P (seen best in FIG. 8) of the central fitting 40 and 50 at the point where the strips extend from the central fitting 40 and 50 (e.g., using a mandrel), and are formed into individual coils (e.g., using a sheet metal curling tool such as a step brake press) as seen in FIGS. 6-8 (three coils 44a', 44b' and 44c') and FIGS. 9-11 (four coils 54a', 54b', 54c' and 54d'). Using the four coil embodiment to illustrate, auxiliary cutting implement 51 may be mounted between an arrow shaft 12 and broadhead 20 by passing threaded shank 30 through central fitting hole 52 and threading threaded shank 30 into the threaded hole (not shown) provided at arrow end 12b. The arrow may then be fired with the coils imparting no adverse effects on the arrow aerodynamics.

Figure 12:
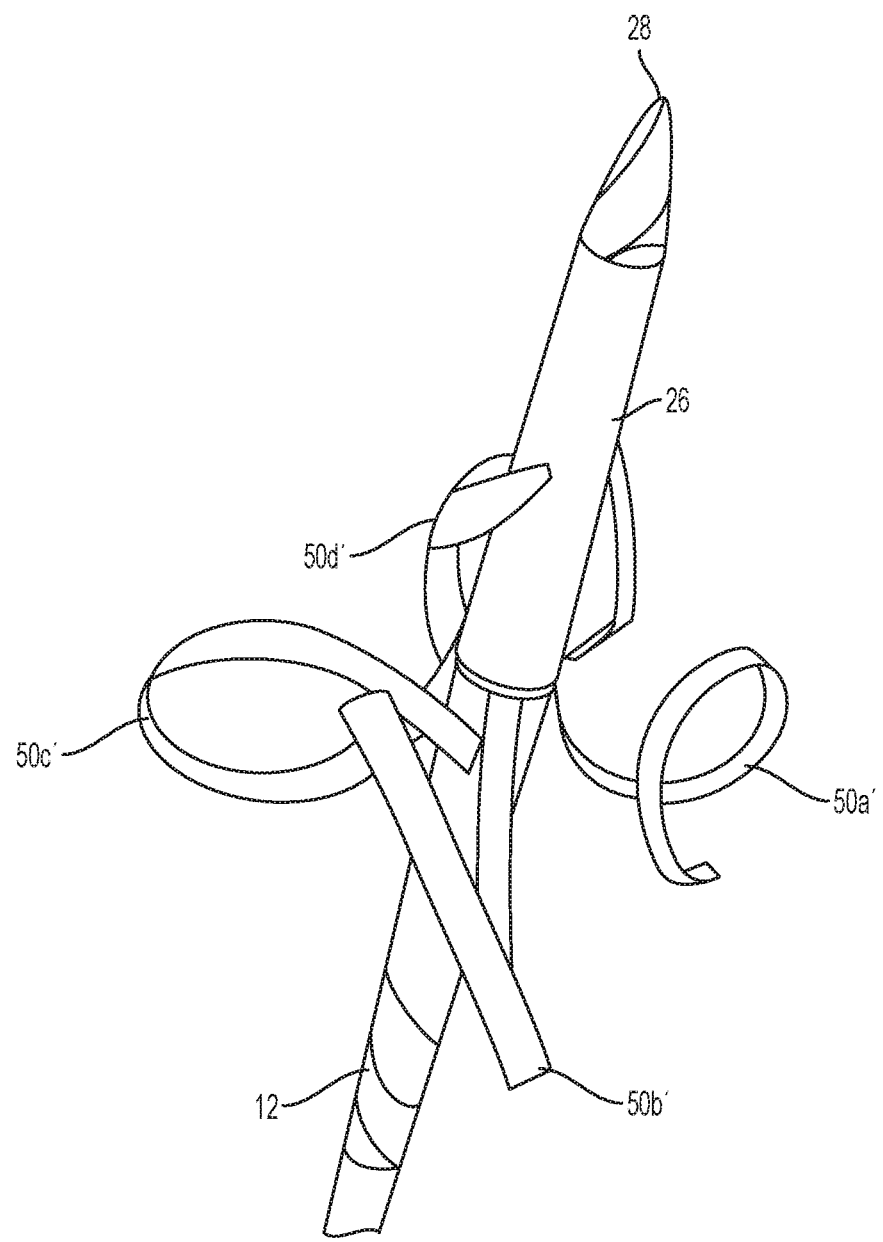
FIG. 12 is a fragmented, perspective view of an embodiment of the four coil auxiliary cutting implement following firing of the arrow to which it is mounted and removal from the stricken animal.

Once the broadhead 20 penetrates the animal, the coils 54a', 54b', 54c' and 54d', which trail behind the broadhead blades 22a and 22b, unroll as they encounter the force imparted by skin, flesh and organs. As the coils unroll, the cutting edges formed on either edge of the coil strips (two per coil) slices through the animal. Since the coils have shape memory they are biased toward the rolled coil position seen in FIGS. 9-11 such that they transition from this initial rolled coil position toward a fully unrolled position and bias back toward the coil position. FIG. 12 illustrates an actual four coil auxiliary cutting implement after removal from the animal. It can be seen the coils have unfurled and are between the rolled coil conditions seen in FIGS. 9-11 and the fully unrolled conditions seen in FIG. 5. As the coil transitions from the rolled coil condition as it travels through the animal, the cutting edges 51a,51b, 53a,53b, 55a,55b and 57a,57b of the coils (there are a total of eight cutting edges in the four coil embodiment) slice through the flesh in all directions producing a cutting area which is significantly greater than that produced by the broadhead blades themselves.

Alternate embodiments of the invention are seen in FIGS. 13-15. FIG. 13 illustrates a cutting implement 60 having three coils 60a-c and a central base 60d mounted directly to the central shaft 70' of a broadhead 70 between the tip 70a and base 70b.

FIG. 14 illustrates an embodiment of the invention comprising a broadhead including at least two or three individual coils 60a-c integrally formed with the blades 70a-c, respectively, of broadhead 70.

FIG. 15 illustrates an embodiment of the invention comprising an arrow where at least two or three individual coils 60a-c are attached directly to an arrow shaft 80a.

Although three individual coils 60a-c are shown in the embodiments of FIGS. 13-15, it is understood that any number of coils may be used as discussed above.

FIGS. 16a-c are examples of individual coils 90a-c, respectively, having different cross-sectional configurations such as oval (FIG. 16a), trapezoidal (FIG. 16b) and triangular (FIG. 16c). These non-round, cross-sectional configurations are merely a few examples and other non-round cross-sectional configurations are possible.

While the invention has been shown and described with reference to certain preferred embodiments thereof, it will be understood by those skilled in the art that various changes in form and details may be made therein without departing from the spirit and scope of the invention as described.

What is claimed is:

1. An auxiliary cutting implement for use with an arrow and broadhead, said auxiliary cutting implement comprising:
   a) a central fitting having a central opening; and
   b) two or more elongated strips each extending radially outwardly from said central fitting and terminating at a free end, each of said elongated strips having first and second opposite side edges formed as a cutting edge, each of said elongated strips further formed into a rolled coil from a respective said free end to a location adjacent said central fitting, each said coil having a non-round cross sectional configuration,
   wherein said elongated strips are formed from a material having spring bias such that when said coils are unrolled, said strips are biased in a direction returning to their rolled condition.

2. The auxiliary cutting implement of claim 1 wherein said central fitting and said elongated strips are formed from the same material.

3. The auxiliary cutting implement of claim 2 wherein said material is stainless steel sheet metal.

4. A broadhead having at least two blades radially extending about a central shaft, said broadhead further including an auxiliary cutting implement comprising at least two elongated strips mounted to said central shaft and terminating in a free end, each of said at least two elongated strips having first and second opposite side edges formed as a cutting edge, each of said at least two elongated strips further formed into a rolled coil from a respective said free end to a location adjacent said central shaft,
   wherein said at least two elongated strips are formed from a material having spring bias such that when said coils are unrolled, said strips are biased in a direction returning to their rolled condition.

5. A broadhead having at least two blades radially extending about a central shaft, said broadhead further including an auxiliary cutting implement comprising at least two elongated strips mounted to said at least two blades, respectively, with each of said two elongated strips terminating in a free end and each of said at least two elongated strips having first and second opposite side edges formed as a cutting edge, each of said at least two elongated strips further formed into a roiled coil from a respective said free end to a location adjacent said central shaft,
   wherein said at least two elongated strips are formed from a material having spring bias such that when said coils are unrolled, said strips are biased in a direction returning to their rolled condition.

6. An arrow having an arrow shaft including a cutting implement having at least two elongated strips attached to said arrow shaft and each elongated strip terminating in a free end and having first and second opposite side edges formed as a cutting edge, each of said at least two elongated strips further formed into a rolled coil from a respective said free end to a location adjacent said arrow shaft,
   wherein said at least two elongated strips are formed from a material having spring bias such that when said coils are unrolled, said strips are biased in a direction returning to their rolled condition.

* * * * *